March 22, 1932.    J. L. CREVELING    1,850,449
ELECTRIC REGULATION
Filed June 3, 1929
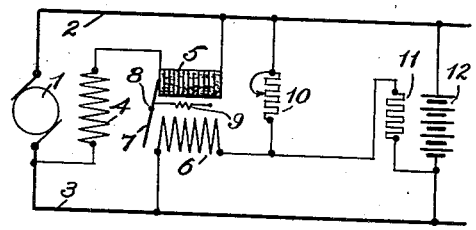
Fig. I.
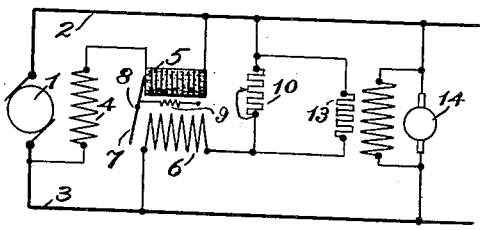
Fig. II.
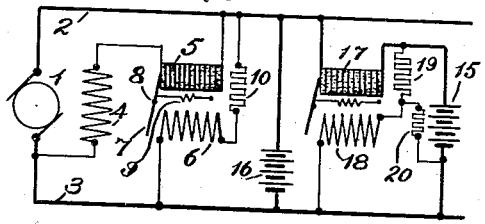
Fig. III.
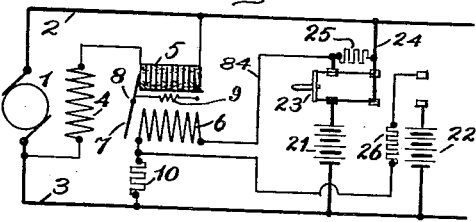
Fig. IV.
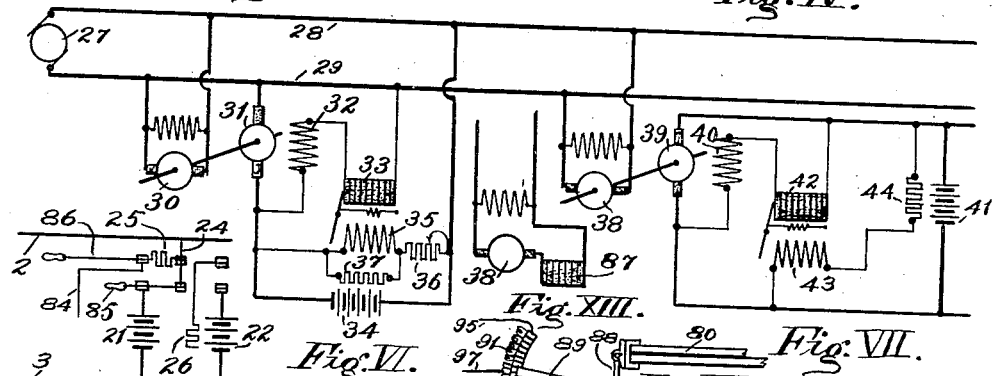
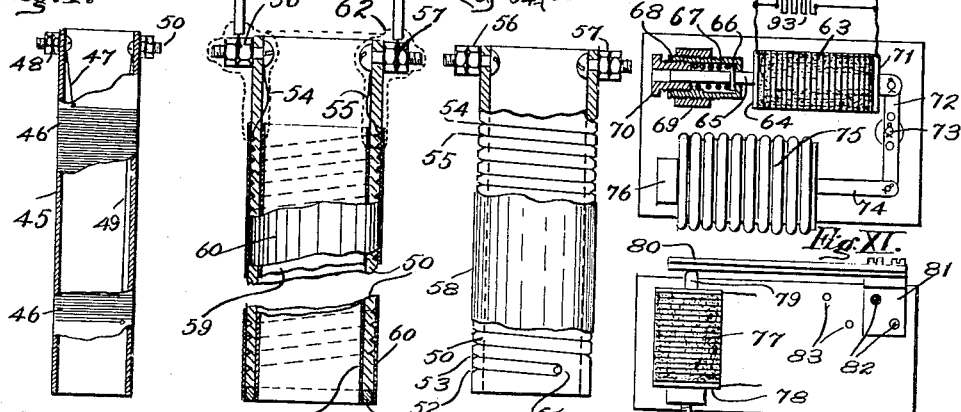
INVENTOR:
John L. Creveling Patented Mar. 22, 1932

1,850,449

UNITED STATES PATENT OFFICE

JOHN L. CREVELING, OF TUCSON, ARIZONA

ELECTRIC REGULATION

Application filed June 3, 1929. Serial No. 367,958.

My invention pertains, broadly, to that class of electric regulation wherein the voltage upon or current in a circuit is to be regulated in a predetermined manner, and has for its principal object to cause the regulating functions to be affected automatically in accordance with temperature changes.

In the drawings, Figs. I, II, III, IV, VI and VII diagrammatically indicate systems employing various embodiments of my invention, chosen for illustration merely, while Fig. V indicates a modification that may be made in the system of Fig. IV, and Fig. XIII a modification that may be made in the system of Fig. VII, to illustrate further uses of my invention. Figs. VIII to XII, inclusive, and Fig. XIV illustrate types of temperature responsive devices which I have found useful in the employment of my invention.

In Fig. I, 1 represents a suitable source of potential difference, as a dynamo or generator, having a positive lead 2 and a negative lead 3 across which is placed a suitable shunt field winding, indicated at 4, which is provided with regulating means, in this instance shown as a carbon pile 5 in series therewith and controlled by the magnet or winding 6, which is indicated as attracting the armature or lever 7, pivoted at 8, and normally affected by spring 9 tending to compress the pile 5 and lower the resistance thereof. The coil 6 is shown in shunt across the leads 2 and 3 through a resistance 10 which may be adjustable as indicated, if desired. 11 indicates a temperature responsive device in shunt to the coil 6 and affecting the results produced by said coil. The load upon the generator in this instance is shown as a storage battery 12 (as the same is a convenient example), upon which it is assumed different voltages should be impressed in accordance with the temperature of the battery or its surrounding atmosphere, and, therefore, the device 11 is indicated as in close proximity to the battery so as to have as nearly as necessary the same temperature. And it is obvious that the battery and device 11 may be quite remote from the generator or means for regulating the same, if desired.

In Fig. II, the numerals 1 to 10, inclusive, indicate the same instrumentalities as in Fig. I, or equivalents thereof, while the load is indicated, for example, as a shunt motor 14, and the temperature responsive device 13 is shown in shunt to the resistance element 10 instead of in shunt to the coil 6 as in Fig. I.

In Fig. III the numerals 1 to 10, inclusive, indicate the same parts as in Figs. I and II, and it will be noted that the coil 6 is not shown as directly affected by any temperature responsive device, and, therefore, being a shunt coil, tends to hold constant voltage across the generator 1. The generator is indicated as supplying a load which is assumed not to be seriously affected by temperature changes, or else not exposed to such changes, which is merely indicated, for example, as a battery 16 across the mains. There is also shown in this figure a load, indicated for example as a storage battery 15, which is assumed to require regulation which is brought about by suitable means indicated as a carbon pile 17 in series therewith, having its resistance controlled by the coil 18 in shunt across the battery 15, through the resistance 19; and it is further assumed that the voltage upon the circuit should be affected by temperature changes to which 15 is exposed. A temperature responsive device 20 in shunt to the coil 18 is indicated for this purpose and is shown near the battery or load 15, so as to be affected by such changes.

In Fig. IV the numerals 1 to 10, inclusive, represent the same devices as in the preceding figures, though it will be noted that the resistance 10 is placed between the coil 6 and the lead 3, instead of between lead 2 and the coil, a transposition, obviously, per se, causing no change in the effects of coil 6. In this figure there are shown two loads to be singly supplied from the leads 2 and 3, and indicated, for example, merely as storage batteries 21 and 22, either of which may be thrown on or off the mains by a suitable switch, as shown at 23. It is assumed that, when the load indicated as battery 21 is being supplied and switch 23 is in the position shown, the regulating devices 1 to 10, inclusive, are so adjusted as to hold the proper voltage upon this load with coil 6 in series with resistance 10 across the line, and no temperature adjustment of the regulating devices is necessary to compensate for changes to which the load 21 is exposed. It is also assumed that, when the load indicated by the battery 22 is thrown on by throwing over the switch 23, it is desired to affect the operative adjustment of the coil 6 in a direction which may be accomplished by inserting resistance in series therewith and also to cause the effects produced by coil 6 to be modified by temperature changes to which the load 22 is subjected. Therefore, switch 23 is arranged to short circuit the resistance 25 when load 21 is being supplied, and to insert the resistance when thrown over to supply 22, in which position it also causes the temperature responsive device 26 to be placed in shunt across coil 6 and resistance 25 in series with said coil.

In the modification of this embodiment intended to be brought out in Fig. V, the only change required is assumed to be that a different adjustment is required when the load is shifted than is assumed with respect to Fig. IV. To illustrate this, a different switching arrangement is indicated in Fig. V which may be substituted for that of Fig. IV, and only the parts necessary to bring out this feature are indicated in Fig. V where the switching devices are shown as connecting the load 21 with the line; and it is assumed that, with the resistance 25 in series with the coil 6 and resistance 10 across the leads, the proper voltage is held upon the load 21. It is here assumed that when the load 22 is thrown on, as by throwing over the switch 85, there should be, at the same time or before, an adjustment made in the circuit of coil 6, as accomplished by cutting out the resistance 25, and provision made for temperature compensation by throwing in the temperature responsive device 26 as in Fig. IV. This is shown as accomplished by throwing over the switch lever 86 which then short-circuits resistance 25 and throws 26 in shunt across the coil 6.

In Figs. VI, VII and XIII, my invention is shown as applied to systems operated by current supplied from a source of potential difference which is operating independently of the particular systems which it supplies. That is, the mains 28 and 29 are supplied by the source, indicated as generator at 27, which, for example, may be held at constant voltage, as is the case with the usual central station. In Fig. VI, the individual system to which my invention is applied comprises a load, indicated at 34 as a storage battery, which is to have a voltage impressed thereupon higher than that across the mains 28—29 which shall be automatically maintained and caused to vary to compensate for changes in temperature to which the load may be subjected. For this purpose, a "booster" is employed, comprehending the motor 30 and the generator 31, in the usual manner now well known in the art, while the field 32 is controlled by the pile 33 operated by coil 35 in series with resistance 36 and across the load supply circuit so as to hold the voltage across the load 34 at proper value and substantially constant throughout fluctuations that may take place in practice across the leads, while 37 is a temperature responsive device in shunt to coil 35 for adjusting its effects for changes in temperature at the load. In Fig. VII the individual system is supplied entirely by current furnished by the generator 39, driven by the motor 38 across the supply leads, while the voltage upon the load, indicated as a battery 41, is controlled by the pile 42 in series with the field winding 40, and operated by the coil 43 having in series therewith a temperature responsive device 44 for causing the effect of coil 43 to be varied or adjusted to correspond with temperature changes. Fig. XIII shows a modification which may be incorporated in that type of system and brings out merely that the speed of motor 38 may be varied by varying the resistance of the pile 87 in its armature circuit, instead of varying the field 40 of generator 39 in Fig. VII, for the same purpose, as will be plain to those skilled in the art.

Fig. VIII shows, partly in elevation and partly in section, one type of temperature responsive device which may be used in some of the above embodiments of my invention and comprises a tube of insulating material, such as bakelite 45, having a winding of insulated wire thereupon, as indicated at 46, the ends of said wire, legended 47 and 49, being carried to binding posts 48 and 50 whereby the device is readily connected into circuit. This type of device is primarily designed for use where the temperature to which it is exposed is not very high and where it is to be protected from exposure to fumes or much moisture, against which it may be further reasonably well protected by suitably coating it with varnish or other protective coating.

Figs. IX and X illustrate a device similar to that of Fig. VIII but designed for use under higher temperatures, if necessary, and under more exposed conditions. In these figures, 50 is a tube of insulating material, such as bakelite, lavite, or porcelain, having upon its outer surface a double thread or pair of parallel spiral grooves, as indicated at 52 and 53, between which, near the end of the tube, there is located a pin 51 over which is placed the loop of suitable naked wire which is then wound in the grooves 52 and 53, and the opposite ends of the wire (marked 54 and 55) are attached to the binding posts 56 and 57, respectively. Over the tube there is then placed a thin layer or sheet of mica 58 and the tube then slipped into the metal receptacle formed of the two concentric tubes 59 and 60, properly spaced apart and mechanically united by the annular member or ring 61 which may be soldered or brazed in place to form a tight joint. Tight joints are then made between the tubes 59 and 60 and the upper end of the tube 50, by means of cement and, if desired, the insulated wires connecting the device in circuit may be connected with the binding posts 56 and 57, and the whole end of the tube structure as well as the ends of the wires covered with a proper coating of cement or insulating compound, as indicated in dotted lines at 62.

Fig. XI illustrates another type of temperature responsive device wherein the resistance of the carbon pile 63 may be varied between very wide limits upon temperature changes. The pile is supported by any of the usual means (not shown) with one end against the abutment or end plate 64, carried by the rod 65, to which is fastened the flange 66 pressed in a right-hand direction by the spring 67 within the sleeve 68, screw-threaded into the fixed support 69. 70 is a member, threaded into the sleeve 68, whereby the pressure exerted by the spring 67, tending to hold the plate 64 in the position shown in the drawings, is adjusted; and it is obvious that the normal position of the plate 64 may be adjusted by revolving the screw-threaded sleeve 68 in its support 69, and that the plate may be forced in a left-hand direction against the spring 67. At the opposite end of the pile 63 there is a pressure plate 71 pivotally connected with the lever 72, movable about the fulcrum or pin 73, and having its opposite end connected as by the member 74 with one end of the thermal expansion device, indicated as a metal "bellows", 75, partly filled with ether or some volatile fluid, and supported at the opposite end as by the member 76, so that expansion or contraction of the bellows 75 will affect the pressure upon the pile 63.

Fig. XII illustrates another type of temperature responsive device comprising a carbon pile 77, having one end placed against an adjustable end plate 78, and having a similar plate at the opposite end provided with a member 79, moved to vary the pressure upon the pile by the ordinary bi-metallic temperature responsive element 80, carried by the bracket 81 which is held in place by screws as indicated at 82. The effect of warping, under changes in temperature, of the bi-metallic strip 80 upon the pile 77, may be adjusted within certain limits by adjusting the position of plate 78 and also by moving the bracket about the screws 82, and beyond these limits by moving the bracket and placing the screws in other holes provided for such adjustment, as indicated at 83, while the effect of the temperature changes may be caused to affect the pressure in either direction desired by simply placing the strip 80 with the proper side turned toward the pile.

Fig. XIV illustrates a modification of this bi-metallic strip type of device which may also be applied to the type of structure of Fig. XI, or any structure wherein motion is produced by the heat responsive element.

The operation of my invention may be understood from the following: In the embodiment illustrated in Fig. I, if the generator be running at or above a certain speed, the voltage to be maintained across the leads 2 and 3 and thus across the load 12 may be held substantially constant by the shunt or voltage measuring coil 6 across the circuit which controls the resistance of pile 5, in the manner common to voltage operated regulators such as here indicated, of which several types are now in use and which are now usually made with a resistance unit as shown at 10, having a zero temperature co-efficient acting as a "swamping resistance" whereby the effects of coil 6 are very little altered by the rise in temperature in the coil as the same becomes heated by the operating current in use. The value of voltage to be held constant may be adjusted between reasonable limits by adjusting the spring 9, resistance 10 and the resistance of the temperature responsive device 11, here shown in shunt to the coil 6, which coil 6, being in series with the resistance 10, will have its attractive effect decreased upon decrease of resistance of the device 11. That is, if the load 12 be one requiring an increase in voltage as the temperature of 12 decreases, the device 11 will bring this about if it be affected by this temperature decrease so as to lower its resistance and thereby weaken the coil 6, or vice versa. If the required change in adjustment in response to temperature changes be substantially a "straight line" function and not too great, it may be brought about by using such a responsive device as shown in Fig. VIII, with the wire 46 having a positive temperature coefficient or increase in resistance upon increase in temperature, if the same be exposed to the same temperature changes as the load 12, since the winding 46 is so exposed as to rapidly dissipate the heat generated therein and have its resistance responsive to the temperature of the surrounding medium, such as the atmospheric air in which both the load 12 and the device indicated at 11 are immersed. If the device indicated at 11 is to be exposed to moisture, fumes or the elements, the form shown in Figs. IX and X is better, in that the resistor is protected; and, as a naked wire may be used, instead of an insulated wire as in Fig. VII, the device may be used where higher temperature is to be met.

To take a concrete application of my invention in a system as illustrated in Fig. I, for example, an Edison battery, which requires about 43 volts across its terminals to supply the proper charging current when the battery stands in air at summer temperature (say, in the neighborhood of 80° to 100°F.), will require about 47 to 50 volts to provide this current, if the temperature of the battery be in the neighborhood of 32° F., as when exposed to atmospheric temperature in winter, and the proper intermediate voltages between these limits should vary in proportion to the temperature variation. By using the device of Fig. VIII at 11 in the embodiment indicated in Fig. I, I can readily cause this adjustment to be effected with a relatively small tube 45 wound with fine copper wire, as indicated at 46, if the device of Fig. VIII be exposed to the same temperature as the battery or load 12. A more pronounced adjustment may be caused by using a pure nickel wire at 46, and a still more pronounced adjustment by using pure iron wire, on account of the latter metals having higher temperature coefficients. And, if it be desired to have a still more pronounced adjustment, the iron wire may be so arranged as to operate at a relatively high temperature approaching its "critical" temperature.

It will, of course, be obvious that the adjustment produced may be widely varied by proper design of the regulator and its coil 6 and the values of the resistance 10 and device 11.

The embodiment of my invention illustrated in Fig. II operates in the same manner as that of Fig. I, save that the temperature compensation is in the reverse direction provided the compensating device has the same temperature-resistance characteristics as in Fig. I. It is here assumed that the voltage across the load, merely indicated as a motor 14, should be increased somewhat as the temperature of the load rises, as might be necessary under certain conditions, to compensate for the increase in resistance of the load caused by heating, for example. In this figure, the temperature responsive device 13 is shown in shunt to the resistance 10, instead of in shunt to the coil 6 as in Fig. I, and it will be plain that the results brought about by changes in temperature will be the reverse of those in the arrangement of Fig. I. That is, as the temperature of the device 13 (say, the structure of Fig. VIII) is raised and its resistance increased the coil 6 will maintain a higher voltage upon the generator 1. It will, of course, be obvious that these two embodiments of my invention are, in a sense, complementary, in that, if the device 11 of Fig. I has a negative temperature coefficient, it will bring about the effect produced by the structure of Fig. II with the device 13 having a positive coefficient, and vice-versa.

In Fig. III, the voltage upon the line supplying the load 15 is held substantially constant by the regulator having the pile 5, while the voltage across the load 15 is controlled by the pile 17 in series therewith and operated by coil 18 which, having in series therewith the resistance 19 and in shunt therewith the temperature responsive device 20, will cause the voltage across the load 15 to be held at the normal selected value, at the normal temperature, and increased as the temperature falls (as in Fig. I), if 20 have a positive temperature coefficient, or the reverse if 20 have a negative coefficient. And it will, of course, be plain that these effects may be reversed by changing the connection of the device 20 of Fig. III from that shown as corresponding to that of Fig. I to that of Fig. II.

In the embodiment shown in Fig. IV, with the switch 23 in the position indicated, the generator and regulator comprising parts 1 to 10, inclusive, operate in the same manner as these instrumentalities operate in Fig. III and hold the voltage upon the load 21 at a chosen value without temperature compensation, which is assumed to be unnecessary for this particular load. When switch 23 is thrown over to substitute load 22, the resistance 25 is inserted in line 84 to adjust the regulator for the new load and the effect of the temperature responsive device 26, which is now thrown in to compensate for the temperature changes to which load 22 is exposed, and the system then operates as may be understood from the above outline of the operation of Fig. I. If the load 22 be such that the proper adjustment of the regulator to meet the conditions requires a decrease in resistance when the load 22 is substituted for 21, instead of an increase as assumed in Fig. IV, then the modification indicated in Fig. V may be made in the system of Fig. IV. With this modification, resistance 25 is normally in line 84 when load 21 is supplied and the regulator adjusted accordingly. When the load 22 is substituted for 21, the resistance 25 is short-circuited and the compensating device thrown in.

In the system of Fig. VI, the generator 31 is driven by the motor 30 and raises the voltage from that of the line 28—29 to the value required for the load 34, and the amount of this increase in voltage is controlled by the pile 33 in series with the field winding 32. The pile 33 is controlled by coil 35 in series with the resistance 36, while 37 affects the standard of coil 35 in the same manner as described above with respect to Fig. I. It is, of course, obvious that the compensation brought about by 37 may be in either direction, depending upon the temperature characteristic of the device, as described above with reference to Fig. I, and also that the said device may have its connections shifted to those of Fig. II, if desired, and will then perform in a manner as outlined above with reference to Fig. II.

In the embodiment shown in Fig. VII, the load 41 is supplied entirely from the generator 39, driven by motor 38, and the voltage upon the load circuit is controlled by manipulation of pile 42 in response to the effects produced by coil 43, which in turn are affected by the resistance of the device 44, here indicated as the temperature responsive device exposed to the same temperature conditions as the load 41.

Under certain conditions, the devices shown in Figs. VIII, IX and X will cause sufficient compensation with this arrangement, and it will be noted, if such be used, that the voltage upon load 41 will be increased as the temperature increases, if the device 44 has a positive temperature coefficient, and decreased if its temperature coefficient be negative. For this type of arrangement, i. e., one with the temperature responsive device directly in control of the magnetic circuit, other types of temperature responsive devices will ordinarily be required if much compensation is necessary, as will be later pointed out with respect to Figs. XI, XII and XIV.

In the system of Fig. VII, the regulation of the voltage upon load 41 may be controlled by controlling the speed of the motor 38 instead of the field 40 of the generator 39, and this may be accomplished by using the modification indicated in Fig. XIII, wherein the pile 87 controls the armature current of the motor 38 and may, of course, be responsive to the coil 43 of Fig. VII.

Where greater changes in adjustment are required than can readily be brought about by the devices of Figs. VIII, IX and X, the thermo-responsive devices of Figs. XI, XII and XIV may be used. In the device of Fig. XI, decrease in temperature causes the bellows 8 to contract and relieve the pressure on the pile 63, which may be open-circuited, if desired, at a given temperature by proper adjustment of the member 68 within the support 69, while this effect, of course, can be avoided by use of the shunt 93, if desired. The expansion of the bellows 75 under rise in temperature will tend to compress the pile and lower its resistance to a degree that may be adjusted by spring 67 and nut 70, and then spring 67 will yield so as to prevent injury to the device upon further rise in temperature. It will be obvious that the reverse effect may be brought about by placing bellows 75 on the opposite side of lever 72, and that an unlimited number of temperature responsive characteristics may be obtained by using different size bellows 75 and piles 63 and varying the types of mechanical connections therebetween. With the device of Fig. XII, if the strip 80 is so arranged as to bend toward the pile upon rise in temperature, the resistance of the device may be lowered to any desired degree by properly proportioning the parts, while the reverse effect may be produced by turning the strip over so that it will bend in the reverse direction, and properly proportioning the device Fig. XIV shows a modification of the structure of Fig. XII, in that the strip 80 is connected by link 88 with contact lever 89, pivoted at 90 and sweeping over the contact segments 92, connected by suitable resistance elements indicated at 91. With this arrangement, almost any desired change in adjustment may be brought about upon temperature changes by properly proportioning the various parts, and, obviously, either positive or negative changes may be produced by reversing the bi-metallic strip 80 or reversing the connection of lever 89 and segments 92 in the circuit. That is, the lever 89 may be connected in one leg of the circuit by the flexible connection 94, and the direction of the compensation will depend upon whether the connector 95 or 96 is connected in the other leg. It will further be obvious that, with this device, if lever 89, for example, be connected to the upper or positive lead in Fig. VII and some intermediate segment of 92 (as, for example, the middle segment) be connected with 43 as by connector 97, so as to employ this device at 44, increase in temperature may be caused to decrease the resistance of 41 to a minimum and then increase it as the temperature increase be continued, if this be desired, or, at normal temperature, the resistance inserted may be zero, or any chosen value, and increased or decreased upon temperature changes in either direction.

From the foregoing it will be plain that my invention provides a system of electric regulation which will properly compensate for effects of temperature upon the load or any portion of the load, as desired, and it will be obvious that this function may be useful in and incorporated into a vast number of embodiments other than those here illustrated for example, merely.

It will also be plain that a large variety of temperature responsive devices may be used in place of the ones here illustrated as examples, and that the ones here shown may be subject to vast modifications and methods of operation, which will be evident to those skilled in the art.

I do not wish in any way to limit myself to any of the exact types of structures shown in the accompanying drawings nor to any of the exact modes of operation given in the specification which are used merely to illustrate embodiments of my invention, for it is obvious that considerable change in the structures and operations outlined may be made without departing from the spirit and scope of my invention, which is as set forth in the following claims:

1. An electric system including a load comprehending an electrical device affected by temperature, a regulator and supplemental means affected by temperature for affecting said regulator to compensate for temperature effects upon said device.

2. An electric system including a load comprehending an electrical device affected by temperature, a regulator and supplemental means affected by temperature at said device for affecting said regulator and tending to compensate for temperature effects upon said device.

3. An electric system including a load comprehending an electrical device affected by temperature changes, a regulator and automatic means adjusting the regulator in response to said temperature changes.

4. An electric system including a load comprehending an electrical device affected by temperature changes, a regulator and means automatically affecting the standard of the regulator to compensate for said effects of temperature upon said device, said means being exposed to said temperature changes.

5. An electric system including a load comprehending an electrical device having a characteristic responsive to temperature changes, automatic means for regulating the system and to compensate for such changes in said characteristic.

6. An electric system including a load comprehending an electrical device having a characteristic responsive to temperature changes, a regulator and automatic means affecting the regulator to compensate for such changes in said characteristic, said means being temperature responsive.

7. An electric system including a load comprehending an electrical device having a characteristic responsive to temperature changes, a regulator and automatic means affecting the regulator to compensate for such changes in said characteristic, said means being temperature responsive and subject to temperature changes with said device.

8. An electric system including a load comprehending an electrical device requiring an energy supply with a factor depending upon the temperature at the load, a regulator controlling said factor and automatic temperature responsive means affecting said factor through said regulator.

9. An electric system including a load comprehending an electrical device requiring an energy supply with a factor depending upon the temperature at the load, a regulator tending to hold said factor substantially constant and automatic temperature responsive means affecting said regulator to vary the standard of the same to compensate for effects of temperature upon the device.

10. An electric system including a load requiring an energy supply with a factor depending upon the temperature at the load, means tending to hold said factor constant and automatic temperature responsive means affecting said factor to vary the same to compensate for effects of temperature upon the load and itself exposed to substantially the same temperature as said load.

11. An electric system including a source of electrical potential difference, a load supplied thereby and means for regulating said source adjusted by changes in temperature at said load.

12. An electric system including a source of electrical potential difference, means for controlling the same and tending to preserve constancy thereof, a load comprehending an electrical device affected by temperature and automatic means adjusting the controlling means to compensate for temperature effects upon said device.

13. An electric system including a source of electrical potential difference, means for regulating the same, a load comprehending an electrical device affected by temperature and automatic means affecting the regulating means to compensate for temperature effects upon the said device and affected by temperature changes.

14. An electric system including a source of electrical potential difference, means for regulating the same, a load affected by temperature and automatic means affecting the regulating means to compensate for temperature effects upon the load and affected by temperature changes in the medium surrounding said load.

15. An electric system including a source of voltage and a source of counter-voltage affected by temperature, means for controlling the value of the first-mentioned voltage and means for adjusting the same in response to temperature changes at the second-mentioned source of voltage.

16. The combination with a supply circuit and means supplied thereby tending to absorb a supply varying with temperature changes, means controlling the supply absorbed and means for adjusting the same in response to temperature changes of the supplied means.

17. The combination with a supply circuit and means supplied thereby tending to absorb a supply varying with temperature changes, means controlling the supply absorbed and means for adjusting the same in response to temperature changes of the supplied means causing a factor of said absorbed supply to vary to compensate for said temperature changes upon changes in temperature of the supplied means.

18. An electric system including a generator, a storage battery to be charged thereby having a characteristic affected by temperature, a regulator for the generator tending to cause the same to charge the battery in a predetermined manner with the battery at a given temperature, and temperature responsive means for adjusting the regulator to preserve the said predetermined manner throughout temperature changes of the battery.

19. An electric system including a storage battery having a characteristic affected by temperature changes, a regulator controlling the charging of the battery tending to cause the same to be charged in a predetermined manner with the battery at a given temperature, and temperature affected means for adjusting the regulator to preserve said predetermined manner throughout temperature changes of said battery.

JOHN L. CREVELING.